July 6, 1937.  H. S. STEEN  2,085,876
WASTE MECHANISM
Filed Oct. 30, 1936
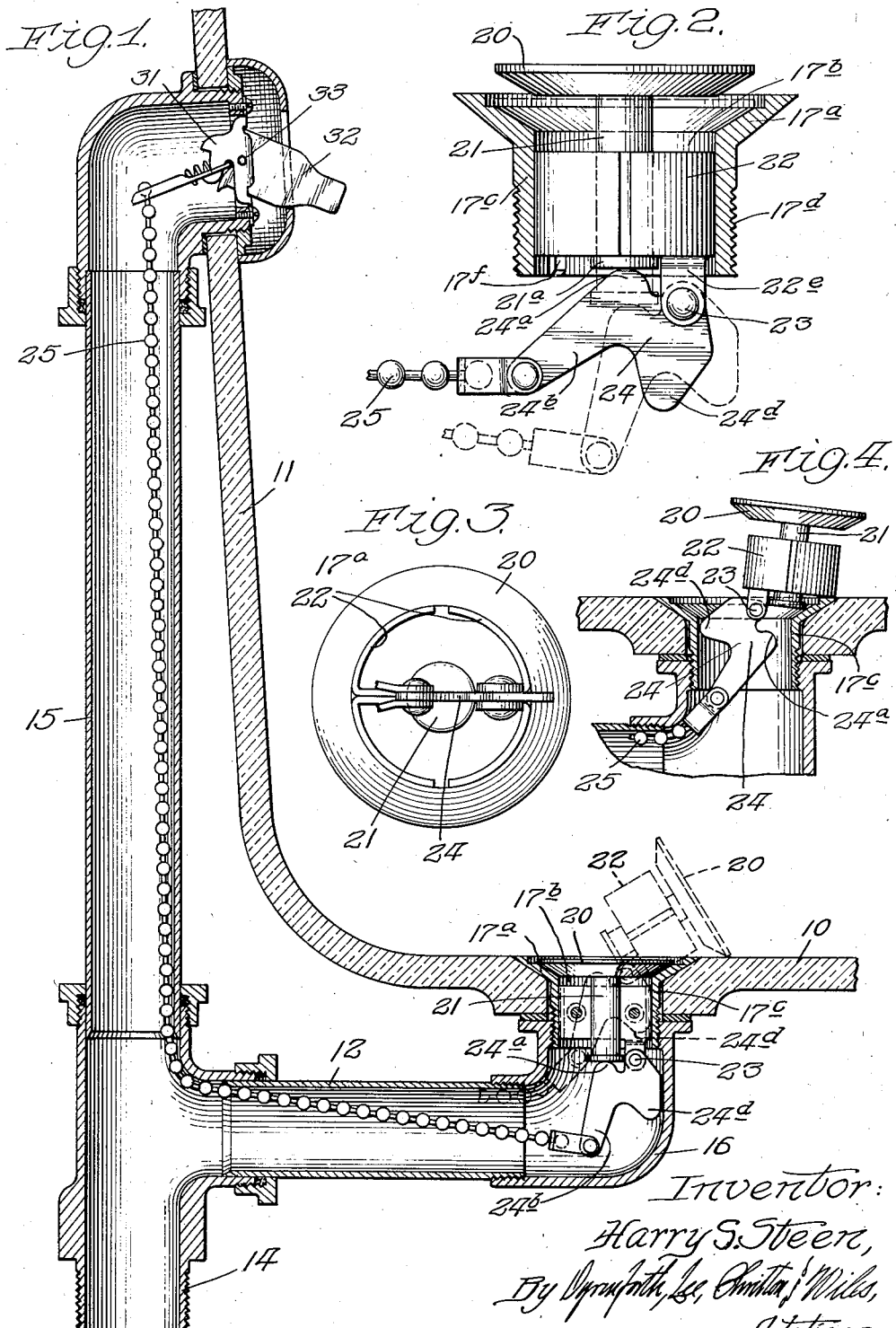
Inventor:
Harry S. Steen,
By Byrnes, Stebbins, Parmelee & Tuttle
Attys.

Patented July 6, 1937

2,085,876

UNITED STATES PATENT OFFICE 2,085,876

WASTE MECHANISM

Harry S. Steen, Chicago, Ill., assignor to Chicago Faucet Company, Chicago, Ill., a corporation of Illinois Application October 30, 1936, Serial No. 108,488

10 Claims. (Cl. 4—199)

My invention relates to improvements in waste mechanism and more especially such mechanism as is adapted for use in connection with the control of waste outlets in bath tubs, laundry trays, wash stands, and other receptacles.

My invention is an improvement on the device disclosed and claimed in my prior Patent 1,818,653 issued August 11th, 1931. Since the construction and operation of the present mechanism, in many respects, is the same as that disclosed in my prior patent, it will not be necessary to describe the mechanism in great detail. It will suffice if I merely point out and emphasize the respects in which the new mechanism differs from that shown in my prior patent.

The particular feature of my invention is the provision of means for preventing the insertion of the spider or guide member in an incorrect position in the outlet sleeve. I also prefer now to mount said guide member in the sleeve practically without friction.

In that form of device embodying the features of my invention shown in the accompanying drawing, Fig. 1 is a vertical sectional view; Fig. 2 is a vertical sectional view on an enlarged scale of the valve, seat member, guide and bell crank; Fig. 3 is a bottom view of the same parts; and Fig. 4 is a view showing how the guide member is prevented from improper insertion in the sleeve of the outlet.

As shown in the drawing, I have followed the same numbering as shown in my prior Patent 1,818,653. I shall again refer to these parts but, in view of the showing in my prior patent, it will not be necessary to explain their construction or operation much in detail.

10 indicates the bottom of a bath tub or other receptacle, and 11 one of the walls thereof. 12 indicates a horizontal waste or drain pipe entering the T-fitting 13, to the lower end of which is connected the outlet 14 leading to the drain or sewer, (not shown). 15 is the overflow pipe.

16 is the elbow connecting the waste pipe 12 with the bottom of the tub. This connection is accomplished by the use of a seat member including a valve seat 17a, surrounding a waste outlet orifice 17b, and provided with a depending sleeve 17c externally threaded as indicated by 17d. This seat member may hereafter be referred to in its entirety by 17.

20 indicates the valve with a depending stem 21 slidably mounted in a spider or guide member 22, the latter now being preferably loosely mounted in the sleeve 17c instead of being frictionally held therein. The guide member is indicated in its entirety by 22 and is provided with a central vertical circular guide for the valve stem 21, said valve stem being provided with a flat head 21a at its lower end.

The member 22 is provided with depending extensions 22e carrying the pivot pin 23 on which is mounted the lever corresponding to the bell crank lever 24, shown in my earlier patent. Since the shape and manner of operation of this lever are somewhat different from that shown in the earlier patent, I shall describe this more in detail.

I have again indicated the entire lever mounted on the pin 23 by the reference numeral 24. This lever is in the nature of a bell crank and has the projection 24a corresponding to the horizontal arm 24a of my earlier patent lying beneath the head 21a on the lower end of the valve stem. 24b indicates the arm to the end of which is attached the lower end of the chain or flexible member 25.

The valve 20 is adapted to close by its own weight. Pull or tension on the chain 25 rocks the member 24 to open it.

17f indicates lugs at the bottom of the sleeve 17c to keep the guide member 22 from falling through.

The control mechanism for pulling or releasing the chain 25 to operate the valve 20 includes a snap switch as indicated in my earlier patent, located adjacent the overflow opening in the tub. This switch includes the supporting member 31 carrying pivotally mounted thereon the vertical rockable tumbler 32, the pivot being indicated by 33. 35 indicates the lever inside to which is attached the upper end of the chain 25. Movement of the tumbler 32 either upwardly or downwardly, near the end of its movement causes the lever 35 to snap to its other position, as described fully in my prior patent.

The chain 25 is led through the waste pipe 12, the T-fitting 13, the overflow pipe 15, and its upper end attached to the movable end of the lever 35. The length of the chain is adjusted so that when the switch is snapped upwardly the valve 20 will be opened, and when the switch is snapped downwardly, there will be sufficient slack in the chain for the valve to close of its own weight.

In Figs. 1 and 4 I have shown how the guide member 22 can be removed from the sleeve 17c for cleaning, repair or replacement purposes from the inside of the tub without the use of any tools. As shown by the broken lines in Fig. 1, the valve 20 with the guide member 22 and member 24 can all be lifted out of the seat member 17.

The particular feature of the present invention is the provision of the rearwardly extending nose or lug 24*d* on the member 24 to prevent the guide member 22 from being inserted in the sleeve 17*c* in an incorrect position. This is clearly illustrated in Fig. 4. In this figure the guide member 22 is shown turned in the wrong position; and when so turned, it will be seen that the pull of the chain 25 rocks the member 24 sufficiently so that the nose or lug 24*d* engages the wall of the sleeve 17*c* to prevent insertion of the guide member 22. That is, as shown in Fig. 4, the guide member 22 being improperly turned cannot be slipped down into the sleeve 17*c*. When it is turned as shown in Fig. 1, however, the nose 24*d* is pulled inwardly sufficiently so that the member 22 will slip into place in the sleeve 17*c*. The particular feature of this invention, therefore, and the improvement over the device of my prior patent is the provision of means on the member 24 which will prevent the guide member 22 from being placed in the sleeve 17*c* in an improper position. As here shown, this means is the lug or projection 24*d* that engages the wall of the member 17*c* when the guide member 22 is not turned the right way.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. Waste mechanism of the character described, including: a seat member having a waste outlet sleeve with a valve seat at the upper end; a guide member in said sleeve; a reciprocable valve adapted to seat on said seat or be raised therefrom, and provided with a stem slidably mounted in said guide member; a reciprocable control member located in a position remote from the valve; a connection between said control member and said valve, including a flexible member, whereby movement of said control member will operate said valve; and means carried by the guide member for preventing insertion of said guide member in an improper position in said sleeve.

2. Waste mechanism, as claimed in claim 1, in which there is provided under the valve stem a bell crank, carried by the guide member, for raising the valve, one end of the flexible member being attached to said bell crank to operate the same, and in which the means for preventing insertion of said guide member in said sleeve in an improper position includes a part on said bell crank.

3. Waste mechanism of the character described, including: a seat member having a waste outlet sleeve with a valve seat at the upper end; a guide member in said sleeve; a reciprocable valve adapted to seat on said seat or be raised therefrom, and provided with a stem slidably mounted in said guide member; a bell crank under the valve stem, carried by the guide member, for raising the valve; a control member located in a position remote from the valve; a connection between said control member and the bell crank for operating the latter by movements of the former; and a part on said bell crank adapted to be swung by its connection with the control member to a position to prevent insertion of the guide member in said sleeve when said guide member is in an improper position.

4. Waste mechanism of the character described, including: a seat member having a waste outlet sleeve with a valve seat at the upper end; a guide member in said sleeve, a reciprocable valve adapted to seat on said seat or be raised therefrom, and provided with a stem slidably mounted in said guide member; a reciprocable control member located in a position remote from the valve; a connection between said control member and said valve, including a flexible member, whereby movement of said control member will operate said valve, said connection including a bell crank carried by the guide member under the valve stem for raising the valve, one end of the flexible member being attached to said bell crank to operate the same, and a part on the bell crank adapted to be swung by tension of the flexible member to prevent insertion of the guide member in the sleeve when the guide member is in an improper position.

5. Waste mechanism of the character described, including; a seat member having a waste outlet sleeve with a valve seat at the upper end; a guide member in said sleeve; a reciprocable valve adapted to seat on said seat or be raised therefrom, and provided with a stem slidably mounted in said guide member; a reciprocable control member located in a position remote from the valve; a connection between said control member and said valve, including a flexible member, whereby movement of said control member will operate said valve; said guide member and valve being removable from the sleeve by drawing the guide member through the space surrounded by the valve seat; and means carried by the guide member for preventing reinsertion of the guide member in the sleeve in an improper position.

6. Waste mechanism of the character described, including: a seat member having a waste outlet sleeve with a valve seat at the upper end; a removable guide member in said sleeve; a reciprocable valve adapted to seat on said seat or be raised therefrom, and provided with a stem slidably mounted in said guide member; and means for preventing insertion of said guide member in said sleeve in an improper position.

7. Waste mechanism of the character described, including: a seat member having a waste outlet sleeve with a valve seat at the upper end; a guide member in said sleeve; a reciprocable valve adapted to seat on said seat or be raised therefrom, and provided with a stem slidably mounted in said guide member; a bell crank under the valve stem carried by the guide member for raising the valve; and means on the bell crank for preventing insertion of the guide member in the sleeve in an improper position.

8. Waste mechanism of the character described, including: a seat member having a waste outlet sleeve with a valve seat at the upper end; a removable guide member in said sleeve; a reciprocable valve adapted to seat on said seat or be raised therefrom, and provided with a stem slidably mounted in said guide member; a reciprocable control member located in a position remote from the valve; a connection between said control member and said valve, including a flexible member, whereby movement of said control member will operate said valve, said connection including a bell crank carried by the guide member under the valve stem for raising the valve, one end of the flexible member being attached to said bell crank to operate the same, and means on the bell crank adapted to be swung by the connection with the control member to a position to prevent insertion of the guide member in the sleeve in an improper position.

9. Waste mechanism of the character described, including: a seat member having a waste outlet sleeve with a valve seat at the upper end; a guide member in said sleeve; a reciprocable valve adapted to seat on said seat or be raised therefrom, and provided with a stem slidably mounted in said guide member, said guide member and valve being removable from the sleeve by drawing the guide member through the space surrounded by the valve seat; and means carried by the guide member for preventing reinsertion of said guide member in said sleeve in an improper position.

10. Waste mechanism as claimed in claim 6 in which the means for preventing insertion of the guide member in the sleeve in an improper position is carried by the guide member.

HARRY S. STEEN.